United States Patent
Tomihashi et al.

(10) Patent No.: US 6,664,336 B1
(45) Date of Patent: Dec. 16, 2003

(54) AQUEOUS CURING COMPOSITION OF FLUOROELASTOMER AND ARTICLE COATED WITH FLUOROELASTOMER

(75) Inventors: Nobuyuki Tomihashi, Settsu (JP); Koichiro Ogita, Settsu (JP); Kiyotaro Terasaka, Settsu (JP); Yasukazu Nakatani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/936,272

(22) PCT Filed: Mar. 8, 2000

(86) PCT No.: PCT/JP00/01378

§ 371 (c)(1), (2), (4) Date: Sep. 10, 2001

(87) PCT Pub. No.: WO00/53675

PCT Pub. Date: Sep. 14, 2000

(30) Foreign Application Priority Data

Mar. 10, 1999 (JP) .............................. 11-063063
Sep. 20, 1999 (JP) .............................. 11-265447

(51) Int. Cl.$^7$ .............................. C08L 27/22
(52) U.S. Cl. ............ 525/199; 524/500; 524/545; 525/195; 525/196; 252/511
(58) Field of Search ................ 524/545, 500; 525/199, 195, 196; 252/511

(56) References Cited

U.S. PATENT DOCUMENTS 4,482,476 A * 11/1984 Yoshimura et al. ......... 252/511
5,854,342 A * 12/1998 Kirochko et al. ........... 524/805

FOREIGN PATENT DOCUMENTS

| EP | A2058393 | 8/1982 |
| EP | 0690096 | * 1/1996 |
| EP | A1690096 | 1/1996 |
| EP | 1 065 243 A | 1/2001 |
| JP | 57 200475 A | 12/1982 |
| JP | 58 090955 A | 5/1983 |
| JP | A6250133 | 3/1987 |
| JP | A11310748 | 11/1999 |
| WO | WO 99 11706 A | 3/1999 |

* cited by examiner

Primary Examiner—Peter D. Mulcahy
Assistant Examiner—Henry S Hu
(74) Attorney, Agent, or Firm—Birch, Stewart, Kolasch & Birch, LLP

(57) ABSTRACT

An aqueous curing composition of a fluoroelastomer containing a fluoroelastomer, a fluororesin, a curing agent, which further contains a surfactant which leaves 0.3 wt. % or less of a decomposition residue after being heated at 300° C. for 30 minutes and/or a polar solvent having a boiling point of 300° C. or less and a surface tension of at least 30 dyne/cm at room temperature. When a coating film is formed from this aqueous composition, a large amount of the fluororesin contained therein can be bled up on the surface of the coating film. Thus, the durability and non-tackiness of the coating film can be improved.

15 Claims, No Drawings

AQUEOUS CURING COMPOSITION OF FLUOROELASTOMER AND ARTICLE COATED WITH FLUOROELASTOMER

This application is the national phase under 35 U.S.C. §371 of PCT International Application No. PCT/JP00/01378 which has an International filing date of Mar. 8, 2000, which designated the United States of America.

FIELD OF THE INVENTION

The present invention relates to an aqueous curing composition of a fluoroelastomer and an article coated with a fluoroelastomer. In particular, the present invention relates to an aqueous curing composition comprising a fluororesin, and an article coated with a coating film formed from such a composition.

BACKGROUND ART

Fluoroelastomer coating compositions are widely used as industrial materials with being coated on or impregnated in fabric, fibers, metals, plastics, rubbers and other various substrates by making use of good heat resistance, weather resistance, oil resistance, solvent resistance and chemical resistance of the fluoroelastomers.

A coating film can be imparted with durability and non-tackiness, when the fluoroelastomer coating compositions contain a fluororesin or a terminal-modified perfluoropolyether (perfluoropolyether having a terminal functional group reactive with the fluoroelastomer such as —$NH_2$, —$CH_2OH$, etc.)

However, the fluoroelastomer is used as a surface coating of a roll which is used in office automation (OA) equipment (e.g. a copying machine, a printer, etc.), the coating film still has insufficient durability, and thus it is desired to improve the durability of the coating film of the fluoroelastomer.

DISCLOSURE OF THE INVENTION

One object of the present invention is to provide an aqueous curing composition of a fluoroelastomer, which can improve the durability and non-tackiness of a coating film thereof by bleeding up a relatively large amount of a fluororesin or an optional terminal-modified perfluoropolyether to the surface of the coating film, when the coating film is formed from the coating composition containing the fluororesin and optionally the terminal-modified perfluoropolyether.

Another object of the present invention is to provide an article coated with a fluoroelastomer, which can solve the above drawbacks of the articles coated with a film formed from the conventional aqueous curing composition of a fluoroelastomer, in particular, the rolls of the office automation equipment.

The above objects can be achieved by an aqueous curing composition of a fluoroelastomer comprising a fluoroelastomer, a fluororesin, a curing agent, an optional terminal-modified perfluoropolyether, and at least one additive component selected from the group consisting of surfactants which leave 0.3 wt. % or less of a decomposition residue after being heated at 300° C. for 30 minutes and polar solvents having a boiling point of 300° C. or less and a surface tension of at least 30 dyne/cm at room temperature, and an article at least a part of the surface of which is coated with a coating film formed from such an aqueous curing composition of a fluoroelastomer.

DETAILED DESCRIPTION OF THE INVENTION

Hereinafter, the components contained in the composition of the present invention will be explained.

(A) Fluoroelastomer

The fluoroelastomer is usually supplied in the form of an aqueous dispersion. The aqueous dispersion of the fluoroelastomer is prepared by dispersing a fluorine-containing elastomeric copolymer (fluoroelastomer) in water at a concentration of 10 to 75% by weight in the presence of a surfactant.

The fluorine-containing elastomeric copolymer is a fluorine-containing copolymer containing repeating units represented by —$CH_2$— in the backbones. One typical example of such a copolymer is a fluorine-containing elastic copolymer comprising vinylidene fluoride. Examples of such copolymer are copolymers comprising at least one repeating unit selected from the group consisting of —$CF_2$—$CH_2$—, —$CH_2$—$CH_2$— and —$CH_2$—$CH(CH_3)$—, and at least one repeating unit selected from the group consisting of —$CF_2$—$CF(CF_3)$—, —$CF_2$—$CF_2$— and —$CF_2$—$CF(ORf)$— in which Rf is a fluoroalkyl group having 1 to 6 carbon atoms.

Specific examples of such copolymers include vinylidene fluoride-hexafluoropropylene copolymers, vinylidene fluoride-tetrafluoroethylene-hexafluoropropylene copolymers, ethylene-hexafluoropropylene copolymers, tetrafluoroethylene-propylene copolymers, etc. Among them, the vinylidene fluoride copolymers are preferable from the viewpoint of their crosslinkability.

Such fluorine-containing elastomeric copolymers are commercially distributed under the trade name of "DAIEL®" (available from Daikin Industries, Ltd.), "VITONE FLOMES®" (available from E. I. dupont), "AFLAS®" (available from ASAHI GLASS Co., Ltd.), etc.

(B) Curing agent and curing accelerator

The curing agent to be contained in the aqueous curing composition of the present invention may be either a conventional diamine curing agent or a conventional polyol curing agent.

Examples of the diamine curing agent include an aminosilane compound of the formula:

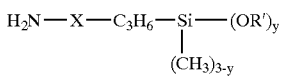

wherein R' is a methyl group or an ethyl group, X is a single bond, —$C_2H_4NH$—, —$CONH$— or —$C_2H_4NH$—$C_2H_4NH$—$NH$—, and y is 2 or 3, or its partially or completely hydrolyzed products, and a polyaminosiloxane compound of the formula:

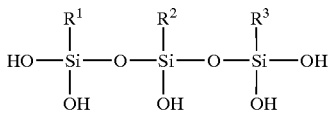

wherein $R^1$, $R^2$ and $R^3$ represent independently of each other a hydrogen atom, an alkyl group having 1 to 6 carbon atom, an amino group, a polyamino group, or an alkyl group having 1 to 6 carbon group at least one hydrogen atom of which is replaced with an amino group or a polyamino group provided that at least two of $R^1$, $R^2$ and $R^3$ are or have amino groups or at least one of $R^1$, $R^2$ and $R^3$ is or has a polyamino group.

The polyol curing agent used in the present invention may be a compounds or a polymer having at least two hydroxyl groups, in particular, phenolic hydroxyl groups in a molecule, and having a curing capability. Specific examples of polyol curing agents include salts of basic compounds with phenol compounds such as

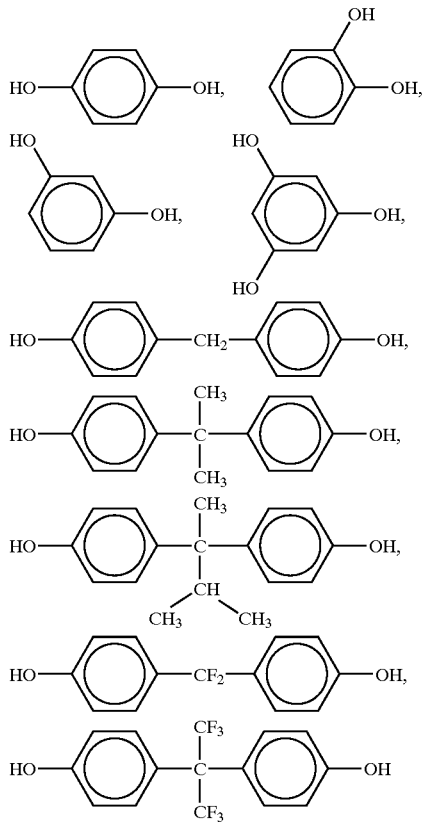

and polyphenols represented by the formula:

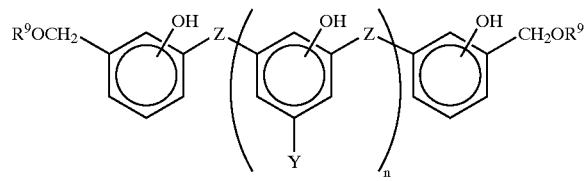

wherein Z is —$CH_2$— or —$CH_2OCH_2$—, Y is a hydrogen atom, a halogen atom, an alkyl group having 1 to 4 carbon atoms, —$CH_2OR$ or —OR in which R is an alkyl group having 1 to 4 carbon atoms, and n is an integer of 0 to 100.

Examples of the basic compounds include ammonium salts, tertiary amines (e.g. 1,8-diazabicyclo-(5.4.0)-undecene-7, etc.), phosphonium salts (e.g. benzyltriphenylphosphonium chloride, methyltriphenylphosphonium-methyl methanephosphonate, etc.), alkali metals (e.g. lithium, sodium, potassium, etc.) and alkaline earth metals (beryllium, magnesium, calcium, barium, etc.). Among them, the salts of hydroquinone, bisphenol A, bisphenol AF and the resol type polyphenols are preferable from the viewpoint of the properties of the coating film.

When the polyol curing agent is used, the following compounds may be compounded as the optional curing accelerators:

Quaternary Ammonium Salts

A quaternary ammonium salt of the formula:

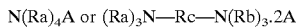

wherein A is an acid radical or a hydroxyl group; Ra and Rb are the same or different and represent an alkyl group having 1 to 20 carbon atoms, a halogenated alkyl group having 1 to 20 carbon atoms or an aryl group having 6 to 20 carbon atoms, provided that two or more of Ra and Rb may together form a carbocyclic group or a heterocyclic group; Rc is an alkylene group having 2 to 21 carbon atom or a phenylene-dialkylene group having 8 to 12 carbon atoms.

Examples of acid radicals include halides, sulfate, sulfite, bisulfite, thiosulfate, sulfide, polysulfide, hydrogen sulfide, thiocyanate, carbonate, bicarbonate, nitrate, carboxylate, borate, phosphate, biphosphate, phosphite, perchlorate, bifluoride, arsenate, ferricyanide, ferrocyanide, molybdate, selenate, selenite, uranate, tungstate, etc.

Specific examples of quaternary ammonium salts include alkyl and aralkyl quaternary ammonium salts (e.g. trimethylbenzylammonium chloride, triethylbenzylammonium chloride, dimethyldecylbenzylammonium chloride, triethylbenzylammonium chloride, myristylbenzyldimethylammonium chloride, dodecyltrimethylammonium chloride, dimethyltetradecylbenzylammonium chloride, trimethyltetradecylammonium chloride, coconuttrimethylammonium chloride, stearyltrimethylammonium chloride, distearyldimethylammonium chloride, tetrabutylammonium hydroxide, 1,4-phenylenedimethylene-bistrimethylammonium dichloride, 1,4-phenylenedimethylene-bistriethylammonium dichloride, ethylenebistriethylammonium dibromide, etc.), and quaternary 1,8-diaza-bicyclo[5.4.0]-7-undecenium salts (e.g. 8-methyl-1,8-diaza-bicylo[5.4.0]-7-undecenium chloride, 8-methyl-1,8-diaza-bicylo[5.4.0]-7-undecenium iodide, 8-methyl-1,8-diaza-bicylo[5.4.0]-7-undecenium hydroxide, 8-methyl-1,8-diaza-bicylo[5.4.0]-7-undecenium methylsulfate, 8-methyl-1,8-diaza-bicylo[5.4.0]-7-undecenium bromide, 8-propyl-1,8-diaza-bicylo[5.4.0]-7-undecenium bromide, 8-dodecyl-1,8-diaza-bicylo[5.4.0]-7-undecenium chloride, 8-dodecyl-1,8-diaza-bicylo[5.4.0]-7-undecenium hydroxide, 8-eicosyl-1,8-diaza-bicylo[5.4.0]-7-undecenium chloride, 8-tetracosyl-1,8-diaza-bicylo[5.4.0]-7-undecenium chloride, 8-benzyl-1,8-diaza-bicylo[5.4.0]-7-undecenium chloride, 8-benzyl-1,8-diaza-bicylo[5.4.0]-7-undecenium hydroxide, 8-phenethyl-1,8-diaza-bicylo [5.4.0]-7-undecenium chloride,-8-(3-phenylpropyl)-1,8-diaza-bicylo[5.4.0]-7-undecenium chloride, etc.).

As a curing accelerator, a quaternary salt of a following amine with an organic or inorganic acid may be used.

Tertiary Amine

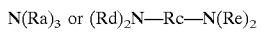

wherein Ra is the same as defined above, and Rd and Re are the same or different and represent an alkyl or alkenyl group having 1 to 20 carbon atoms or an aryl group having 6 to 20 carbon atoms, provided that two or more of Rd and Re may together form a carbocyclic group or a heterocyclic group Examples of the tertiary amines include trimethylamine, triethylamine, tri-n-propylamine, tri-n-butylamine, triisobutylamine, methyldiethylamine, dimethylethylamine, dimethyl-n-propylamine, dimethyl-n-butylamine, dimethylisobutylamine, dimethylisopropylamine, dimethyl-sec.-butylamine, dimethyl-tert.-butylamine, triallylamine, diallylmethylamine, allyldimethylamine, benzyldimethylamine, benzyldiethylamine, N-allylpiperidine, N-ethylpiperidine, N -butylpiperidine, N-methylpyrolidine, N-cyclohexylpyrolidine, N-n-butylpyrolidine, N-ethylpyrolidine, N-benzylpyrolidine, 2,4,6-trimethylpyridine, etc.

Examples of the inorganic or organic acids which form the quaternary salts include the following acids:

HF, HCl, HBr, $(CH_3)_3NH^+Cl^-$, $(CH_3)_3NH^+NO_3^-$, $2(CH_3)_3\ NH^+SO_4^{2-}$, $2(CH_3)_3NH^+CO_3^{2-}$, $(C_4H_9)_3NH^+Cl^-$, $(C_4H_9)_3\ NH^{+NO_3^-}$, $2(C_4H_9)_3NH^+SO_4^{2-}$, $2(C_4H_9)^3NH^+CO_3^{2-}$, $(CH_3)_3NH^+RCOO^-$, $(CH_3)_3NH^+RO^-$, $(C_4H_9)_3NH^+RCOO^-$, $(C_4H_9)_3NH^+RO^-$ wherein R is an alkyl or alkenyl group having 1 to 20 carbon atoms or an aryl group having 6 to 20 carbon atoms.

Primary and secondary amines are less preferable since they may induce reactions other than the polyol curing. Tertiary amines having pKa of less than 8 are less preferable since they have a low curing rate and thus give low film strength.

Phosphonium salts may also be used as curing accelerators.

(c) Quaternary Phosphonium Salts

Examples of the phosphonium salts include benzyltriphenylphosphonium chloride, methyltriphenylphosphonium-methyl methanephosphonate, bis(benzyldiphenylphophine) iminium chlroide, etc.

Furthermore, organic acids can be added to improve the storage stability of the composition. Organic acids having 1 to 12 carbon atoms, preferably 1 to 4 carbon atoms are used. Organic acids having 10 or more carbon atoms are less preferable, since they remain in the coating films. Preferable examples of the organic acids are monocarboxylic acids such as formic acid, acetic acid, propionic acid, etc.; and dicarboxylic acids such as oxalic acid, malonic acid, succinic acid, etc.

The organic acids suppress the polyol curing of fluorine-containing copolymers in the compositions during storage. However, the organic acids evaporate or decompose when the compositions are applied, dried and baked, and then the basic compound can accelerate the curing reaction. Thus, the organic acid is regarded as "curing accelerators" according to the present invention.

The composition of the present invention comprises 0.5 to 30 wt. parts, preferably 1 to 20 wt. parts of the diamine curing agent, per 100 wt. parts of the fluoroelastomer in the case of the diamine curing, or the composition comprises 0.1 to 10 wt. parts, preferably 0.5 to 5 wt. parts of the polyol curing agent, and 0 to 10 wt. parts, preferably 0.01 to 5 wt. parts of the curing accelerator, per 100 wt. parts of the fluoroelastomer in the case of the polyol curing. When the amount of the curing accelerator is less than the above lower limit, the curing may not proceed. When the amount of the curing accelerator exceeds the above upper limit, it may be difficult to control the curing reaction.

(C) Fluororesin and Terminal-modified Perfluoro polyether

Furthermore, the composition of the present invention contains 5 to 900 wt. parts of a fluororesin and optionally a terminal-modified perfluoropolyether per 100 wt. parts of the fluoroelastomer to impart durability or non-tackiness to the coating film formed from the composition. A ratio of the fluororesin to the terminal-modified perfluoropolyether is arbitrary.

Examples of the fluororesin include polyvinylidene fluoride (PVdF), ethylene-tetrafluoroethylene copolymers (ETFE), polychlorotrifluoroethylene (PCTFE), tetrafluoroethylene-hexafluoropropylene-perfluoroalkyl vinyl ether copolymers (EPA), tetrafluoroethylene-hexafluoropropylene copolymers (FEP), tetrafluoroethylene-perfluoroalkyl vinyl ether copolymers (PFA), polytetrafluoroethylene (PTFE), terminal-modified EPA, terminal-modified FEP, terminal-modified PFA, etc. Among them, tetrafluoroethylene base polymers are preferable from the viewpoint of the non-stickiness.

The fluororesin is preferably used in the form of an aqueous dispersion from the viewpoint of dispersibility.

The terminal-modified perfluoropolyether to be used in the present invention comprises at least one repeating unit selected from the group consisting of $—[CF(CF_3)—CF_2O]—$, $—(CF_2O)—$, $—(CF_2CF_2O)—$ and $—(CF_2CF_2CF_2O)—$ in its backbone. The total number of the repeating units is from 1 to 1,000.

Examples of functional groups which modify the molecular terminals of the perfluoropolyether include Cl, Br, I, $NR_1R_2$ wherein $R_1$ and $R_2$ are independently of each other and represent a hydrogen atom, an aryl group, a $C_1$–$C_{10}$ alkyl or cycloalkyl group, SH, NCO, $NO_2$, COOH, $PO_2H$, $SO_3H$, OH, a glycidyl group and a hydroxyphenyl group. The functional groups may be present at the terminals of the backbone or the terminal of side chains of the perfluoropolyether of the above formula.

These functional groups may be directly bonded to the backbone consisting of the above repeating units of the perfluoropolyether, or through a group of the formula: $—(CH_2)_n—$, $—(CF_2)_n—$, $(CF_2O)_n—$ or $—(CH_2O)_n—$ in which n is a number of 1 to 100.

(D) Polar Solvent

The composition of the present invention contains 1 to 100 wt. parts of a polar solvent having a boiling point of 300° C. or less and a surface tension of at least 30 dyne/cm at room temperature, per 100 wt. parts of the fluoroelastomer to bleed up a relatively large amount of the fluororesin or the optional terminal-modified perfluoropolyether on the surface of the coating film.

In the coating film which is being baked, the polar solvent forces the fluororesin and/or the terminal-modified perfluoropolyether to migrate onto the surface of the coating film, while it evaporates when the fluororesin and/or the terminal-modified perfluoropolyether are sufficiently molten.

Examples of such polar solvents include ethylene glycol, propylene glycol, trimethylene glycol, tetramethylene glycol, pentamethylene glycol, glycerin, N-methylpyrrolidone, dimethylsulfoxide, triethylene glycol, etc.

(E) Surfactant

Ionic surfactants and nonionic surfactants may be used as surfactants to disperse the fluoroelastomer, the fluororesin and various additives in water, but they should be decomposed at a relatively low temperature. That is, in the present invention, the surfactant should leave 0.3 wt. % or less of a decomopsition residue after being heated at 300° C. for 30 minutes.

Examples of such surfactants include nonionic surfactants having no phenyl group such as a polyoxyethylene alkyl ether of the formula:

wherein R" is an alkyl group having 5 to 18 carbon atoms, preferably 10 to 16 carbon atoms, and n is a number of at least 1 (one) preferably up to 30; and a polyoxyethylenepolyoxypropylene block copolymer of the formula:

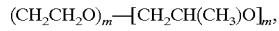

wherein m, m' and n are each a number of at least 1 provided that the sum of m, m' and n is preferably no more than 1,000.

These surfactants are preferable from the viewpoint of environment protection, since they are prepared without using any chemical material that is doubtful if it may have internal secretion disturbing functions as a raw material, and they are synthesized from internal secretion non-disturbing materials.

Since surfactants having a high decomposing point remain in the coating film during baking, they will disturb the bleeding up of the fluororesin and the terminal-modified perfluoropolyether.

The surfactant, which leaves 0.3% by mole or less of the decomposition residue after being heated at 300° C. for 30 minutes, is added to the composition in an amount of 1 to 100 wt. parts per 100 wt. parts of the fluoroelastomer.

When the polar solvent (D) is added to the composition, a surfactant having a high decomposing point such as a compound of the formula:

R''—Ph—O(CH$_2$CH$_2$O)$_n$H wherein R'' and n are the same as defined above may be used in place of or in addition to the above easily decomposable surfactant. However, such a surfactant having a high decomposing point is prepared from a chemical material which is doubtful if it may have internal secretion disturbing functions as a raw material, it may contain a trace amount of such a chemical material. Therefore, such a surfactant is preferably used after it is purified as much as possible to remove such a chemical material.

(F) Additives

The composition of the present invention may contain various additives which are added to conventional fluoroelastomer compositions, for example, fillers, colorants, acid-acceptors, and the like, in addition to the above components.

Examples of the fillers are carbon black, white carbon, calcium carbonate, barium sulfate, etc., and examples of the colorants are inorganic pigments, compound oxide pigments, etc.

Examples of the acid-acceptors are magnesium oxide, lead oxide, zinc oxide, lead carbonate, zinc carbonate, double salts such as hydrotalcite, etc. Compounds having a high activity such as calcium hydroxide are less preferred, since they tend to cause gelation. Preferably, the acid-acceptors have a smaller pKa than that of the above basic compounds. When the pKa of acid-acceptors is high, the compositions of the present invention tend to be gelled.

In general, the acid-acceptor is compounded in an amount of from 1 to 40 wt. parts per 100 wt. parts of a fluorine-containing copolymer, depending on its activity.

The amount of the fluoroelastomer to be contained in the composition of the present invention is from 1 to 500 wt. parts, preferably from 5 to 300 wt. parts, more preferably from 10 to 150 wt. parts, per 100 wt. parts of water.

The compositions of the present invention may be applied by the same methods as those for applying the conventional aqueous curing composition of the fluoroelastomer. For example, the compositions are applied to an article to be coated by brush coating, spray coating, dip coating, flow coating, dispenser coating, screen coating, etc. according to the properties of the compositions, and thoroughly dried. Then, the compositions coated are baked at a temperature of from 150 to 300° C. for 10 to 120 minutes.

The aqueous curing composition of the fluoroelastomer according to the present invention can improve the durability and non-tackiness of the coating film by bleeding up a relatively large amount of the fluororesin and/or the optional terminal-modified perfluoropolyether contained in the composition on the surface of the coating film.

Furthermore, a surface layer may be formed on the coating film formed from the composition of the present invention. The surface layer may be formed from the above fluororesin and/or the above terminal-modified perfluoropolyether by a conventional method.

The surface of an article to be coated is preferably well degreased and cleaned prior to the application of the composition.

It is preferable to form a primer layer on the surface of the article with silane primers, silicone primers, etc. to increase the adhesion between the article and the composition.

Examples of the articles to be coated with the composition of the present invention include metals (e.g. iron, stainless steel, copper, aluminum, brass, etc.), glass products (e.g. such as glassplates, fabric or non-woven fabric of glass fiber, etc.), molded articles and coated articles of general or heat-resistant resins (e.g. polypropylene, polyoxymethylene, polyimide, polyamideimide, polysulfone, polyethersulfone, polyether-etherketone, etc.), molded articles and coated articles of general rubbers (e.g. styrene-butadiene rubber (SBR), butyl rubber, nitrile rubber (NBR), ethylene-propylene rubber (EPDM), etc.) and heat-resistant rubbers (e.g. silicone rubber, fluoroelastomer, etc.), fabric or non-woven fabric of natural and synthetic fibers, and the like.

The articles coated with the film formed from the composition of the present invention can be used in various fields which require heat resistance, solvent resistance, lubrication and/or non-stick properties. Specific examples of the applications include rolls (e.g. fixing rolls, press rolls, etc.) and conveying belts for OA equipment such as copying machines, printers, facsimiles, etc.; sheets and belts; O-rings, diaphragms, chemical-resistant tubes, fuel hoses, valve seals, gaskets for chemical plants, engine gaskets, and the like.

EXAMPLES

The present invention will be illustrated by the following examples.

Example 1

Preparation of "Fluoroelastomer Dispersion A"

A copolymer of vinylidene fluoride (VdF)-tetrafluoroethylene (TFE)-hexafluoropropylene (HFP) (molar ratio=65:18:17) was prepared by emulsion polymerization, and the resulting polymer solution was concentrated with surfactants (a 20 wt. % aqueous solution of EMULGEN 108 available from KAO Corporation and a 20 wt. % aqueous solution of EMULGEN 109P available from KAO Corporation, both containing C$_{12}$H$_{25}$—(CH$_2$CH$_2$O)$_n$H as the main component) to a solid concentration of 60 wt. %. This dispersion will be referred to as "Fluoroelastomer Dispersion A".

Preparation of "Fluororesin Dispersion A"

A copolymer of tetrafluoroethylene (TFE)-hexafluoropropylene (HFP) (molar ratio=85:15) was prepared by emulsion polymerization, and the resulting polymer solution was concentrated with a surfactant (a 20 wt. % aqueous solution of EMULGEN 108 available from KAO Corporation) to a solid concentration of 52 wt. %. This dispersion will be referred to as "Fluororesin Dispersion A".

Preparation of "Pigment Paste A"

A filler (TALOX R-516L) (3 wt. parts) and an acid-acceptor (DHT-4A available from KYOWA KAGAKU KOGYO Kabushikikaisha) (5 wt. parts) were dispersed in pure water (46 wt. parts) together with a surfactant (a 20 wt. % aqueous solution of EMULGEN 108) (2 wt. parts) to obtain a paste, which will be referred to as "Pigment Paste A".

Preparation of Coating Composition

Fluoroelastomer Dispersion A (38 wt. parts), Fluororesin Dispersion A (44 wt. parts), Pigment Paste A (12 wt. parts), Thickening Agent A (a 5 wt. % aqueous solution of DS-60HN available from NOF Corporation) (4 wt. parts) and Thickening Agent B (a 50 wt. % aqueous solution of UH-140S available from ASAHI DENKA KOGYO K.K.) (2 wt. parts) were mixed and well dispersed. To the aqueous dispersion obtained (100 wt. parts), a diamine curing agent (GLS-213B available from Daikin Industries, Ltd.) (5 wt. parts) was added to obtain a coating composition, which will be referred to as "Coating Composition A".

Formation of a Coating Plate

On the surface of an aluminum plate, a primer (GLP-102NR available from Daikin Industries, Ltd.) was applied to a dry thickness of about 5 μm, and dried at 80° C. for 15 minutes.

On the primer layer formed, Coating Composition A was spray coated and dried at 80 to 100 C. for 15 minutes, followed by baking at 300° C. for 30 minutes to obtain a coating plate having a film thickness of about 35 μm (including the primer layer).

Properties of a Coating film

The durability and non-tackiness of the coating film were evaluated as follows:

<Durability>

The surface of the coating film, which was heated at a temperature in the range between 160 and 170° C., was rubbed with a copying paper (recycled PPC paper sheet available from Fuji Xerox Co., Ltd.) using a Taber abrader at a revolution rate of 60 rpm under a load of 500 g. The number of revolutions, at which a contact angle of a wet-index standard liquid (31 dyne/cm) measured with a goniometer, was used as a measure of durability.

Example 2

The same procedures as those in Example 1 were repeated except that propylene glycol (5 wt. parts) was additionally used in the preparation of Coating Composition A.

Example 3

In the preparation of the coating composition, Fluoroelastomer Dispersion A (38 wt. parts), Fluororesin Dispersion A (44 wt. parts), Pigment Paste A (12 wt. parts), Thickening Agent A (4 wt. parts) and Thickening Agent B (2 wt. parts) were mixed and well dispersed. To the aqueous dispersion obtained (100 wt. parts), a polyol curing agent (a 10 wt. % aqueous solution of sodium salt of bisphenol AF) (4 wt. parts) and a curing accelerator (SA610-50 available from SAN-APRO Co., Ltd.; main component: formate salt of DBU) (0.5 wt. part) were added to obtain a coating composition, which will be referred to as "Coating Composition B".

The same procedures as those of Example 1 were repeated except that Coating Composition B was used in place of Coating Composition A.

Example 4

The same procedures as those of Example 3 were repeated except that propylene glycol (5 wt. parts) was additionally used in the preparation of Coating Composition B.

Comparative Example 1
Preparation of "Fluoroelastomer Dispersion B"

A copolymer of VdF-TFE-HFP (molar ratio=65:18:17) was prepared by emulsion polymerization, and the resulting polymer solution was concentrated with surfactants (a 20 wt. % aqueous solution of HS-208 available from NOF Corporation and a 20 wt. % aqueous solution of HS-215 available from NOF Corporation, both containing $C_8H_{17}$—Ph—O$(CH_2CH_2O)_nH$ as the main component) to a solid concentration of 60 wt. %. This dispersion will be referred to as "Fluoroelastomer Dispersion B".

Preparation of "Fluororesin Dispersion B"

A copolymer of TFE-HFP (molar ratio=85:15) was prepared by emulsion polymerization, and the resulting polymer solution was concentrated with a surfactant (a 20 wt. % aqueous solution of HS-208) to a solid concentration of 52 wt. %. This dispersion will be referred to as "Fluororesin Dispersion B".

Preparation of "Pigment Paste B"

A filler (TALOX R-516L) (3 wt. parts) and an acid-acceptor (DHT-4A) (5 wt. parts) were dispersed in pure water (46 wt. parts) together with a surfactant (a 20 wt. % aqueous solution of HS-208) (2 wt. parts) to obtain a paste, which will be referred to as "Pigment Paste B".

Preparation of Coating Composition

Fluoroelastomer Dispersion B (38 wt. parts), Fluororesin Dispersion B (44 wt. parts), Pigment Paste B (12 wt. parts), Thickening Agent A (4 wt. parts) and Thickening Agent B (2 wt. parts) were mixed and well dispersed. To the aqueous dispersion obtained (100 wt. parts), a diamine curing agent (GLS-213B) (5 wt. parts) was added to obtain a coating composition, which will be referred to as "Coating Composition C".

Then, the same procedures as those in Example 1 were repeated except that Coating Composition C was used in place of Coating Composition A.

Comparative Example 2

The same procedures as those in Comparative Example 1 were repeated except that propylene glycol (5 wt. parts) was additionally used in the preparation of Coating Composition C.

Comparative Example 3

In the preparation of the coating composition, Fluoroelastomer Dispersion B (38 wt. parts), Fluororesin Dispersion B (44 wt. parts), Pigment Paste B (12 wt. parts), Thickening Agent A (4 wt. parts) and Thickening Agent B (2 wt. parts) were mixed and well dispersed. To the aqueous dispersion obtained (100 wt. parts), a polyol curing agent (a 10 wt. % aqueous solution of sodium salt of bisphenol AF) (4 wt. parts) and a curing accelerator (SA610-50) (0.5 wt. part) were added to obtain a coating composition, which will be referred to as "Coating Composition D".

The same procedures as those of Comparative Example 1 were repeated except that Coating Composition D was used in place of Coating Composition C.

Comparative Example 4

The same procedures as those of Comparative Example 3 were repeated except that propylene glycol (5 wt. parts) was additionally used in the preparation of Coating Composition D.

Comparative Example 5

The same procedures as those of Comparative Example 1 were repeated except that N-methylpyrrolidone (5 wt. parts) was additionally used in the preparation of Coating Composition C.

Comparative Example 6

The same procedures as those of Comparative Example 3 were repeated except that triethylene glycol (5 wt. parts) was additionally used in the preparation of Coating Composition D.

Example 5
Preparation of "Fluoroelastomer Dispersion C"

A copolymer of VdF-TFE-HFP (molar ratio=65:18:17) was prepared by emulsion polymerization, and the resulting polymer solution was concentrated with a surfactant (a 20 wt. % aqueous solution of PRONON 204 available from NOF Corporation containing $(CH_2CH_2O)_m$—$[CH_2CH(CH_3)O]_n$—$(CH_2CH_2O)_m$, as the main component) to a solid concentration of 60 wt. %. This dispersion will be referred to as "Fluoroelastomer Dispersion C".

Preparation of "Fluororesin Dispersion C"

A copolymer of TFE-HFP (molar ratio=85:15) was prepared by emulsion polymerization, and the resulting polymer solution was concentrated with a surfactant (a 20 wt. % aqueous solution of PRONON 204) to a solid concentration of 52 wt. %. This dispersion will be referred to as "Fluororesin Dispersion C".

Preparation of "Pigment Paste C"

A filler (TALOX R-516L) (3 wt. parts) and an acid-acceptor (DHT-4A) (5 wt. parts) were dispersed in pure water (46 wt. parts) together with a surfactant (a 20 wt. % aqueous solution of PRONON 204) (2 wt. parts) to obtain a paste, which will be referred to as "Pigment Paste C".

Preparation of Coating Composition

Fluoroelastomer Dispersion C (38 wt. parts), Fluororesin Dispersion C (44 wt. parts), Pigment Paste C (12 wt. parts), Thickening Agent A (4 wt. parts) and Thickening Agent B (2 wt. parts) were mixed and well dispersed. To the aqueous dispersion obtained (100 wt. parts), a diamine curing agent (GLS-213B) (5 wt. parts) was added to obtain a coating composition.

Then, the same procedures as those in Example 1 were repeated except that the coating composition prepared in the above was used in place of Coating Composition A.

Example 6
Preparation of "Fluoroelastomer Dispersion D"

A copolymer of VdF-TFE-HFP (molar ratio=65:18:17) was prepared by emulsion polymerization, and the resulting polymer solution was concentrated with surfactants (a 20 wt. % aqueous solution of DISPERNOL TOC available from NOF Corporation containing $C_{13}H_{27}$—$O(CH_2CH_2O)_nH$ as the main component, and a 20 wt. % aqueous solution of EMULGEN 210 available from KAO Corporation containing $C_{16}H_{33}$—$O(CH_2CH_2O)_nH$) to a solid concentration of 60 wt. %. This dispersion will be referred to as "Fluoroelastomer Dispersion D".

Preparation of "Fluororesin Dispersion D"

A copolymer of TFE-HFP (molar ratio=85:15) was prepared by emulsion polymerization, and the resulting polymer solution was concentrated with a surfactant (a 20 wt. % aqueous solution of DISPERNOL TOC) to a solid concentration of 52 wt. %. This dispersion will be referred to as "Fluororesin Dispersion D".

Preparation of "Pigment Paste D"

A filler (TALOX R-516L) (3 wt. parts) and an acid-acceptor (DHT-4A) (5 wt. parts) were dispersed in pure water (46 wt. parts) together with surfactants (a 20wt. % aqueous solution of DISPERNOL TOC and a 20 wt. % aqueous solution of EMULGEN 210) (2 wt. parts) to obtain a paste, which will be referred to as "Pigment Paste D".

Preparation of Coating Composition

Fluoroelastomer Dispersion D (38 wt. parts), Fluororesin Dispersion D (44 wt. parts), Pigment Paste D (12 wt. parts), Thickening Agent A (4 wt. parts) and Thickening Agent B (2 wt. parts) were mixed and well dispersed. To the aqueous dispersion obtained (100 wt. parts), a polyol curing agent (a 10 wt. % aqueous solution of sodium salt of bisphenol AF) (4 wt. parts) and a curing accelerator (SA610-50) (0.5 wt. part) were added to obtain a coating composition.

Then, the same procedures as those in Example 1 were repeated except that the coating composition prepared in the above was used in place of Coating Composition A.

Measurement of the Content of Decomposition Residue of Surfactants

About 5 g of a surfactant was sampled in an aluminum cup, kept standing in an air at 100° C. for 15 minutes and then heated 5 in the air at 300° C. for 30 minutes. After that, the weight of the aluminum cup containing the decomposition residue was measured, and the amount of the decomposition residue was calculated from the original weight and the weight after heating.

The results obtained in Examples and Comparative Examples are shown in Table 1, the properties of the surfactants are shown in Table 2, and the properties of the polar solvents are shown in Table 3.

TABLE 1

| Ex. No. | Curing system | Surfactant | Polar solvent | Durability (No. of Rev.) |
|---|---|---|---|---|
| Ex. 1 | Diamine | EMULGEN 108 EMULGEN 109P | — | 350 |
| Ex. 2 | Diamine | EMULGEN 108 EMULGEN 109P | Propylene glycol | 400 |
| Ex. 3 | Polyol | EMULGEN 108 EMULGEN 109P | — | 340 |
| Ex. 4 | Polyol | EMULGEN 108 EMULGEN 109P | Propylene glycol | 360 |
| C. Ex. 1 | Diamine | HS-208 HS-215 | — | 200 |
| C. Ex. 2 | Diamine | HS-208 HS-215 | Propylene glycol | 230 |
| C. Ex. 3 | Polyol | HS-208 HS-215 | — | 140 |
| C. Ex. 4 | Polyol | HS-208 HS-215 | Propylene glycol | 160 |
| C. Ex. 5 | Diamine | HS-208 HS-215 | N-methyl-pyrrolidone | 250 |
| C. Ex. 6 | Polyol | HS-208 HS-215 | Triethylene glycol | 220 |
| Ex. 5 | Diamine | PRONON 204 | — | 310 |
| Ex. 6 | Polyol | DISPERNOL TOC EMULGEN 210 | — | 340 |

TABLE 2

| | Amount of decomposition residue (%) |
|---|---|
| EMULGEN 108 | 0 |
| EMULGEN 109P | 0 |
| HS-208 | 0.38 |
| HS-215 | 2.29 |
| PRONON 204 | 0 |
| DISPERNOL TOC | 0.27 |
| EMULGEN 210 | 0 |

TABLE 3

| | Propylene glycol | N-methyl-pyrrolidone | Triethylene glycol |
|---|---|---|---|
| Boiling point (° C.) | 188 | 202 | 288 |
| Surface tension at room temperature (dyne/cm) | 72 | 41 | 45 |

What is claimed is:

1. An aqueous curing composition of a fluoroelastomer comprising: a fluoroelastomer, a fluororesin, a curing agent, and a surfactant, wherein the surfactant leaves 0.3 wt. % or less of a decomposition residue after the surfactant is heated at 300° C. for 30 minutes.

2. The aqueous curing composition of a fluoroelastomer according to claim 1, wherein at least a part of said fluororesin is replaced with a terminal-modified perfluoropolyether.

3. The aqueous curing composition of a fluoroelastomer according to claim 1 or 2, which comprises 1 to 100 parts by weight of said surfactant per 100 parts by weight of said fluoroelastomer.

4. The aqueous curing composition of a fluoroelastomer according to claim 1 or 2, wherein said surfactant is a compound synthesized from an internal secretion non-disturbing material.

5. An article at least a part of the surface of which is coated with a coating film formed from the aqueous curing composition of a fluoroelastomer according to claim 1.

6. The article according to claim 5, which is a roll for office automation equipment.

7. The aqueous curing composition of a fluoroelastomer according to claim 1, which further comprises a polar solvent having a boiling point of 300° C. or less and a surface tension of at least 30 dyne/cm at room temperature.

8. The aqueous curing composition of a fluoroelastomer according to claim 7, wherein said polar solvent is contained in an amount of 1 to 100 parts by weight per 100 parts by weight of said fluoroelastomer.

9. The aqueous curing composition of a fluoroelastomer according to claim 1, wherein said surfactant is a polyoxyethylene alkyl ether nonionic surfactant.

10. The aqueous curing composition of a fluoroelastomer according to claim 1, wherein said surfactant is a polyoxyethylenepolyoxypropylene block copolymer nonionic surfactant.

11. The aqueous curing composition of a fluoroelastomer according to claim 1, wherein said surfactant is of the formula:

$$R''\!-\!O(CH_2CH_2O)_nH$$

wherein R'' is an alkyl group having 5 to 18 carbon atoms and n is a number of at least 1 preferably up to 30.

12. The aqueous curing composition of a fluoroelastomer according to claim 1, wherein said surfactant is of the formula:

$$(CH_2CH_2O)_m\!-\![CH_2CH(CH_3)O]_n\!-\!(CH_2CH_2O_{m'}$$

wherein m, m' and n are each of number of at least 1 provided that the sum of m, m' and n is preferably no more than 1,000.

13. The aqueous curing composition of a fluoroelastomer according to claim 1, wherein said surfactant is of the formula:

$$R''\!-\!Ph\!-\!O(CH_2CH_2)_nH$$

wherein R'' is an alkyl group having 5 to 18 carbon atoms, n is a number of at least 1, and Ph is a phenyl group.

14. The aqueous curing composition of a fluoroelastomer according to claim 1, wherein said surfactant is of the formula:

$$R''\!-\!O(CH_2CH_2O)_nH$$

wherein R'' is an alkyl group having 10 to 16 carbon atoms and n is a number of at least 1 to 30.

15. The aqueous curing composition of a fluoroelastomer according to claim 1, wherein said surfactant is of the formula:

$$R''\!-\!Ph\!-\!O(CH_2CH_2)_nH$$

wherein R'' is an alkyl group having 10 to 16 carbon atoms, n is a number of at least 1 to 30, and Ph is a phenyl group.

* * * * *